(12) United States Patent
Arbel et al.

(10) Patent No.: US 7,127,861 B2
(45) Date of Patent: Oct. 31, 2006

(54) MULTI-PURPOSE STRUCTURE

(75) Inventors: Avraham Arbel, Ramat Hashaeon (IL); Oded Yekutieli, Macabim (IL); Itzhak Kleinmann, Rehovot (IL); Mordechy Barak, Nachal Ayalon (IL); Hagai Beres, Rishon Le-Zion (IL)

(73) Assignee: State of Israel, Ministry of Agriculture and Rural Development Agricultural Research Organization, Volcani Center, Beit Dagan (IL)

( * ) Notice: Subject to any disclaimer, the term of this patent is extended or adjusted under 35 U.S.C. 154(b) by 0 days.

(21) Appl. No.: 10/450,496

(22) PCT Filed: Dec. 12, 2001

(86) PCT No.: PCT/IL01/01157

§ 371 (c)(1),
(2), (4) Date: Sep. 25, 2003

(87) PCT Pub. No.: WO02/47471

PCT Pub. Date: Jun. 20, 2002

(65) Prior Publication Data

US 2004/0049991 A1 Mar. 18, 2004

(30) Foreign Application Priority Data

Dec. 15, 2000 (IL) .................................. 140349

(51) Int. Cl.
*E04B 1/12* (2006.01)
*E04B 1/32* (2006.01)
*E04B 7/08* (2006.01)
*E04B 7/14* (2006.01)
*E04H 15/00* (2006.01)

(52) U.S. Cl. .................... 52/639; 52/63; 52/83; 52/222

(58) Field of Classification Search .................. 52/639, 52/222, 83, 63; 135/160, 115, 119, 908; 47/17
See application file for complete search history.

(56) References Cited

U.S. PATENT DOCUMENTS 1,926,159 A * 9/1933 McKee ...................... 52/639 X
2,019,831 A * 11/1935 Ricardo .................... 52/639 X (Continued)

FOREIGN PATENT DOCUMENTS

DE        296 22 346 U        4/1997

(Continued)

OTHER PUBLICATIONS

English language Abstract to German Patent DE 29622346 U1.*

*Primary Examiner*—Rodney B. White
(74) *Attorney, Agent, or Firm*—Lowe Haupman & Berner LLP

(57) ABSTRACT

A multi-purpose structure, especially useful as a greenhouse or other plant-protective structure, comprising; (a) a framework comprising a plurality of vertical supports, said vertical supports being arranged in rows that extend the entire width of the structure, wherein each of said rows contains at least two vertical supports having substantially the same height, said framework further comprising a plurality of connecting members that connect the vertical supports in a row to one another at junction points located at the tops of said supports; the framework further comprises a plurality of permanent cross strips extending perpendicularly to said connecting members; (b) at least one flexible sheet adapted to be weaved through said connecting members and extending the entire length of the framework so as to form at least a part of a roof of said framework.

16 Claims, 3 Drawing Sheets

U.S. PATENT DOCUMENTS

| | | | | |
|---|---|---|---|---|
| 3,765,134 | A * | 10/1973 | Gilchrist | 52/63 |
| 3,982,361 | A * | 9/1976 | Deutsch et al. | 52/222 X |
| 4,068,404 | A * | 1/1978 | Sheldon | 52/83 X |
| 4,837,990 | A * | 6/1989 | Peleg | 52/63 |
| 5,197,238 | A * | 3/1993 | Peleg | 52/222 X |
| 5,311,699 | A * | 5/1994 | Huffman | 52/83 X |
| 5,513,470 | A * | 5/1996 | Vollebregt | 52/63 X |
| 5,564,234 | A * | 10/1996 | Vermeulen | 52/63 |
| 5,596,843 | A * | 1/1997 | Watson | 52/222 X |
| 5,597,005 | A * | 1/1997 | Thomas | 52/83 X |
| 6,247,484 | B1 * | 6/2001 | Thomas | 52/83 X |
| RE37,498 | E * | 1/2002 | Thomas | 52/83 X |
| 6,502,593 | B1 * | 1/2003 | Stafford | 52/222 X |
| 6,564,513 | B1 * | 5/2003 | Henbid et al. | 52/222 X |
| 6,668,495 | B1 * | 12/2003 | Prince | 52/63 |
| 2001/0023561 | A1 * | 9/2001 | Henbid et al. | 52/222 |

FOREIGN PATENT DOCUMENTS

| | | |
|---|---|---|
| FR | 2 044 676 A | 2/1971 |
| FR | 2 363 981 A | 4/1978 |
| FR | 2 522 928 A | 9/1983 |

* cited by examiner

MULTI-PURPOSE STRUCTURE

FIELD OF THE INVENTION

The present invention relates to multi-purpose structures. More specifically, the present invention relates to a multi-purpose structure having an innovative design so as to enable simple and quick removal and replacement of one or more coverings of said structure, according to specific the needs of the user.

BACKGROUND OF THE INVENTION

Greenhouses and other protective structures are well-known in the art Typically, a greenhouse comprises a steel framework that is covered with one or more layers of transparent material (usually glass) so as to trap sunlight inside and provide an appropriate environment for the growth of plants. A greenhouse may also serve to protect plants from harsh weather conditions. Other protective structures for plants may be constructed from more flexible material such as plastic or netting. These structures may be more suitable in parts of the world having a warmer climate, in order to protect the plants from too much sunlight. In either case, however, with changing seasons and changing outdoor weather conditions, it is often desirable to modify the protective structure (or remove the protective structure altogether) so as to achieve a maximal environment for the plants. For example, in cold weather, it is usually desirable to have a transparent covering on the structure, so that the greatest amount of sunlight can penetrate and be trapped inside the structure. However, as the temperature outside rises, it is desirable to find ways for reducing the sunlight penetrating to the structure or for providing better air ventilation, such as by exchanging the transparent covering for a partially-transparent or opaque one, such as a mesh or cover shade, as is known in the art. Other options include whitewashing the structure or inserting ventilation devices. Unfortunately, carrying out any of these steps often proves to be overly-complicated, time consuming, and expensive. There is a need for a simple-to-use protective structure for plants that can be easily modified and adapted as environmental and climatic circumstances dictate.

It is therefore the main object of the present invention to provide a multi-purpose structure having a unique design so as to enable rapid and simple exchange of one or more coverings of said structure. It is furthermore an object of the present invention to provide a multi-purpose structure that is manufactured and used at a relatively low cost, that is highly user-friendly, and that can be adapted for virtually any climate in any part of the world.

SUMMARY OF THE INVENTION

The present invention provides a multi-purpose structure, especially useful as a greenhouse or other plant-protective structure, comprising;
  (a) a framework comprising a plurality of vertical supports, said vertical supports being arranged in rows that extend the entire width of the structure, wherein each of said rows contains at least two vertical supports having substantially the same height, said framework further comprising a plurality of connecting members that connect the vertical supports in a row to one another at junction points located at the tops of said supports; the framework further comprises a plurality of permanent cross strips extending perpendicularly to said connecting members;
  (b) at least one flexible sheet adapted to be weaved through said connecting members and extending the entire length of the firework so as to form at least a part of a roof of said framework;
  and die cross-strips in combination with the flexible sheets provide coverage to the structure and limit the escape of heat and moisture from within the structure.

In accordance with a preferred embodiment of the present invention, the structure is adapted for having a plurality of flexible sheets inserted therein. In some preferred embodiments, each of the flexible sheets has a width substantially equal to the width between two vertical supports in a single vertical support row, such that each flexible sheet is adapted to be inserted between two vertical supports in a vertical support row, and is weaved through the connecting members so as to extend securely through the entire length of the structure. In some embodiments, the width of the flexible sheets may be wider or narrower that the actual width between the vertical supports. In the case of wider sheets, said sheets are weaved through in a similar manner, but may be folded over to form a double layer sheet, for example. Narrower sheets may be used in situations where it is desired to have openings In the covering where air can easily pass through. In some embodiments, following insertion of a flexible sheet, said sheet may be drawn In at its sides at any portion thereof, for providing, for example, air ventilation.

In certain preferred embodiments, the flexible sheets are weaved through the connecting members in a substantially alternating manner: below the first connecting member and above the second connecting member, and so on (this pattern repeating itself). In other preferred embodiments, the flexible sheets are weaved through the connecting members in a different manner, for example, above the first 2 connecting members and below the third one, and so on (this pattern repeating itself) until the end of the structure is reached. It should be appreciated that numerous variations for the pattern of weaving and for the heights of the connecting members are possible.

Preferably, the flexible sheets are selected from materials having varying degrees of transparency, such as different types of plastics or mesh materials.

The rows of vertical supports are constructed with predetermined height pattern such that when said flexible sheet is weaved through the connecting members, the roof of the framework assumes a predetermined form. For example, in one preferred embodiment, every other row of vertical supports has substantially the same height such that when said flexible sheet is weaved through the connecting members, the roof of the framework assumes a form having a plurality of triangle-shaped peaks.

In certain preferred embodiments of the present invention, the framework further comprises a plurality of horizontal posts positioned perpendicular to the rows of vertical supports and connecting at least a portion of the vertical supports to one another. The horizontal posts provide extra structural support for the framework.

In the present invention, the framework comprises a plurality of cross strips extending perpendicularly to and engaged by connecting members. In one embodiment, the cross strips are made of plastic, though it is appreciated that they may be made of any suitable material.

In other preferred embodiments of the present invention, the structure further comprises at least one pole positioned inside at least one of said vertical supports. The pole is adapted to be moved upwardly so as to extend from the top of a vertical support After the desired number or flexible sheets are inserted into the structure, the poles located inside the vertical supports are raised, thereby causing the flexible sheets to be held tightly within the framework.

The framework of the structure including the cross strips is designed to be permanent while the flexible sheets are designed to be easily placed into and removed from the framework. For example, in the winter season, transparent flexible sheets may be maintained in the framework. When the spring comes, the transparent flexible sheets may be exchanged for mesh or other suitable flexible sheets. The sides of the framework may also have flexible sheets that are be adapted to be removed and replaced, though it is not necessary for the purposes of the present invention (said sides may also have permanent walls, or said sides may be left open if desired).

BRIEF DESCRIPTION OF THE DRAWINGS

The present invention is herein described, by way of example only, with reference to the accompanying drawings, wherein.

DETAILED DESCRIPTION OF THE DRAWINGS

It is appreciated that the detailed description that follows is intended only to illustrate certain preferred embodiments of the present invention. It is in no way intended to limit the scope of the invention, as set out in the claims.

Figure 1:
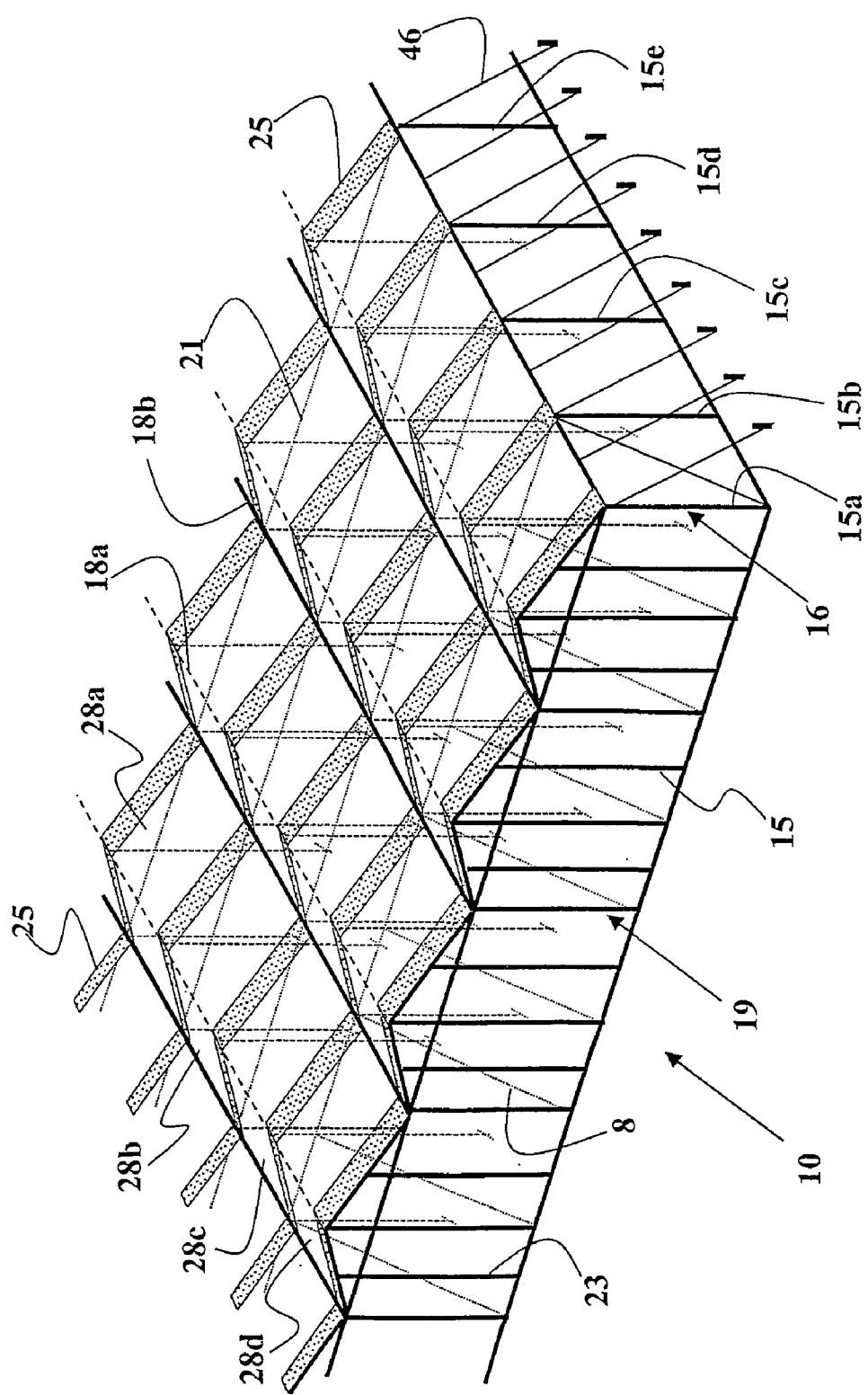
FIG. 1 is an isometric view of a multi-purpose structure, according to a preferred embodiment of the present invention

Referring first to FIG. 1, the multi-purpose structure of the present invention comprises a framework 10 having a plurality of vertical supports 15. Said vertical supports 15 are arranged in rows wherein each row contains vertical supports of substantially the same height, for example, row 16, comprised of vertical supports 15a, 15b, 15c, 15d, and 15e (in structures built on non-level ground, it may be desirable to have vertical supports of different lengths so that the tops of said vertical supports each reach the same height). It is appreciated that the number of vertical supports in each row, as well as the number of rows, varies according to the desired size of the multi-purpose structure. The structure need not be symmetric, but may be constructed, for example, according to the area and shape of the space to be covered. Furthermore, the framework may have additional supports, such as support element 23, preferably located along the width and length of the perimeter of the structure, in between the vertical supports (in FIG. 1, support elements are shown only in the length-wise direction). Additional support elements may be added in the interior of the framework as well. The vertical supports may be constructed of any suitable material such as stainless steel, aluminum, wood or plastic and are designed to provide appropriate standing support for the structure.

A series of connecting members, for example, connecting member 18, functions to connect the vertical supports in each row to one another at the tops of said vertical supports. The connecting members and vertical supports are attached to one another through by any appropriate means known in the art. The connecting members are preferably rod-like and may also be made of any suitable material such as stainless steel, aluminum or plastic. Said connecting members preferably extend the entire width of the framework.

In usage, one or more flexible sheets are weaved through the connecting members of the framework, thereby providing a partial or complete covering for the framework. The structure may have multiple purposes. In the winter season, for example, transparent flexible sheets may be installed that enable the structure to function as a greenhouse. In the summer season, flexible sheets comprised of netting may be installed for providing protecting against the sun or for promoting air ventilation.

Four flexible sheets 28a, 28b, 28c, and 28d, can be seen weaved through the connecting members of the framework 10 of FIG. 1. It is appreciated, however, that not all of the sheets need to be inserted at any given time. A predetermined portion of the structure may be left open, for example, by only inserting every other or every third flexible sheet (and the actual type of flexible sheet may be varied as well). In the context of the present invention, the term 'weaving' is meant to imply that the flexible sheets are inserted through the framework in a woven manner, above some connecting members and below other connection members, in a patterned manner. In the embodiment illustrated in FIG. 1, the flexible sheets are weaved through the connecting members in an alternate manner. In this embodiment, every other row of vertical supports has substantially the same height (for example, row 16 has the same height as row 19) such that the connecting members can divided into raised connecting members such as 18a and lowered connecting members such as 18b, according to the heights of the vertical supports in the respective row (raised connecting members are shown in broken lines because the flexible sheets are over them, while lowered connecting members are shown in solid lines, because the flexible sheets inserted under diem). Thus, in this preferred embodiment, when flexible sheets are inserted into the framework, the roof of the framework assumes a form having triangular-shaped peaks. Depending on the pattern of the heights of the vertical supports, the roof may take on other forms as well, such as rectangular, etc. . . . . .

A series of horizontal beams, for example beam 21 are preferably positioned perpendicular to the rows of vertical columns and function to provide additional structural support by connecting the lowered vertical supports to one another. Furthermore, a series of anchors, for example, anchor 46, are situated along the perimeter of the structure, also for providing support for the framework. Further structural support may be provided by a series of angled beams, such as angled beam 8. Following insertion of the desired number of flexible sheets, said flexible sheets are preferably attached to the connecting members located at either end of the framework. Said attachment may be accomplished through any appropriate means known in the art. In certain embodiments, an automated or manual rolling mechanism is positioned at one end of the framework, that facilitates insertion and removal of the desired number of flexible sheets.

In the present invention, a plurality of cross strips, for example cross strip 25, are positioned perpendicular to and engaged by the connecting members 18. A single cross strip 25 extends from the vertical support in a particular position of a vertical support row to the corresponding vertical support in the next vertical support row, and so on, across the entire length of the structure. The cross strips are permanent and are affixed only to those connecting members that are in the lowered orientation (said cross strips being attached between the lowered connecting member and the corresponding vertical support and said cross strips passing over the raised connecting member without being attached thereto). The cross strips may be made of any suitable material such as plastic or netting. The cross strips may serve multiple purposes, such as covering portions of the framework that may not be covered when the flexible sheets are installed. The cross-strips act to cover the gap present between two adjacent flexible sheets, and limit the escape of heat and moisture from within the structure, which is especially important in the harsh winter months. The climate within he structure is more highly preserved due to the presence of the cross-strips. When the gap between the flexible sheets is covered by cross-strips, the area encompassed by the flexible sheets is thus entirely enclosed, and insects cannot penetrate through these gaps to reach the crops. Said cross strips may comprise single or multiple layers. In one preferred embodiment two layers of plastic comprising the cross-strips serve to "sandwich" the edges of the flexible sheets when said flexible sheets are inserted on either side of said cross-strips. When the maximal number of flexible sheets have been inserted, the interior of the structure is completely covered due to the overlapping between the cross-strips and the flexible sheets. It is appreciated, however, that since the cross-strips and the flexible sheets are not bound to one another along their lengths, (though in certain preferred embodiments, they may be temporarily affixed to one another), rain water is allowed to enter the enclosure from the roof. Thus, the need for drainage pipes that are usually required in structures with triangular roofs is avoided. Should need be, however, drainage pipes or gutters may be constructed in order to avoid over-watering or flooding. For example, in one embodiment (not illustrated), two lowered connecting members are positioned adjacent to one another and drainage means are positioned In between and below said connecting members for collecting rain water.

Figure 2:
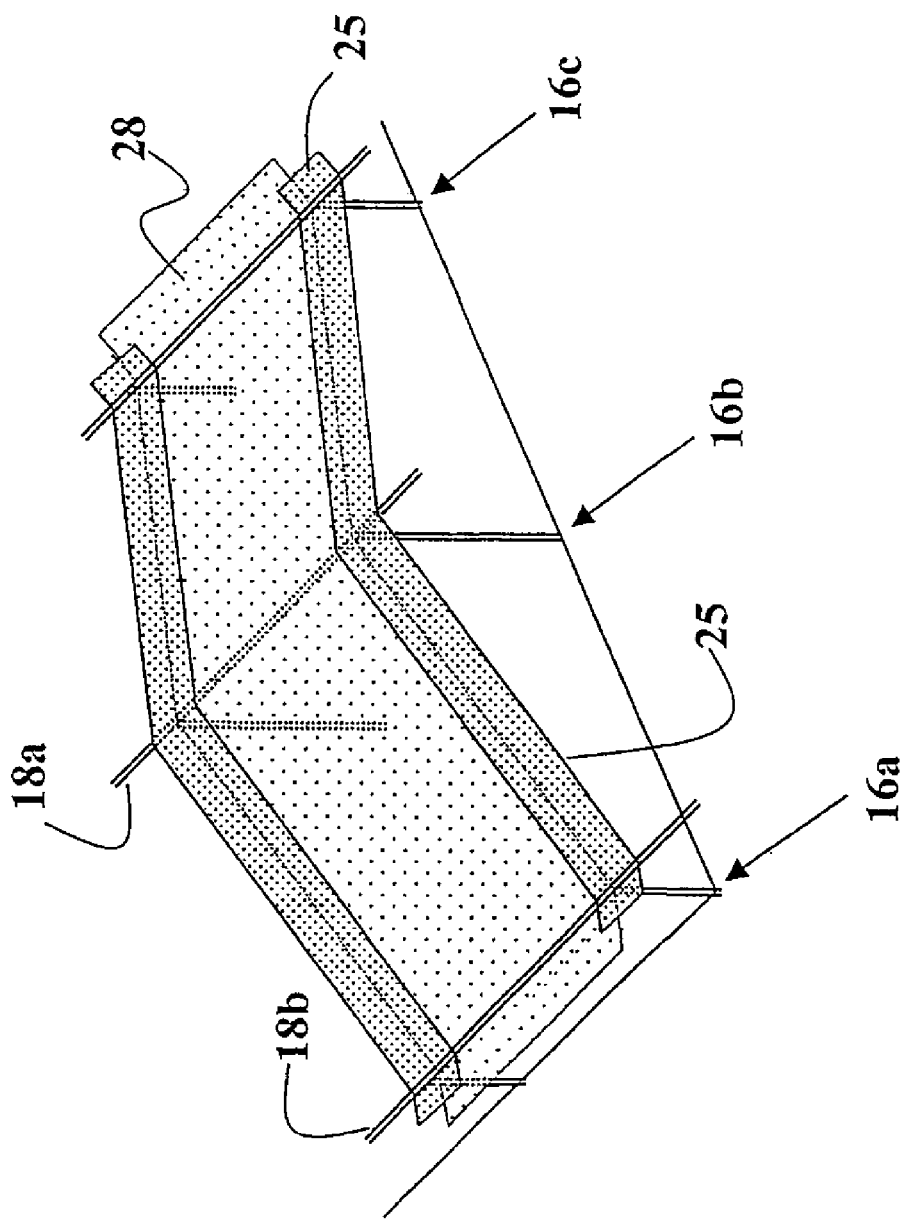
FIG. 2 is an isometric view of a portion of the multi-purpose structure of FIG. 1, illustrating the positioning therein of a flexible sheet

Referring to FIG. 2, a portion of a multi-purpose structure is illustrated with a flexible sheet 28 inserted therein. For the purposes of clarification only, the framework is shown having 3 rows (16a, 16b, and 16c) of 2 vertical support members each A flexible sheet 28 is shown inserted therein In this example, the flexible sheet is inserted below the lowered connecting members (for example, connecting member 18b) and above raised connecting member 18a. It is appreciated that the structure may have much larger dimensions than tis and that many flexible sheets may be easily inserted and subsequently removed from the structure, as needed. Each flexible sheet 28 is sufficient to extend the entire length of the structure and has a width sufficient to substantially extend the distance between any two vertical supports in a vertical support row. For example, in one preferred embodiment, the distance between vertical supports of a single vertical support row is approximately 4 meters and the distance between rows is also approximately 4 meters. The total area covered by the structure may be, for example, 32 square meters. In this embodiment, the width of the flexible sheet should be approximately 3.6–3.9 meters. These dimensions, however, are entirely for the purpose of example only, and in no way intend to limit the scope of the invention, as set out in the claims.

Cross-strips 25 are shown on either side of the flexible sheet 28, and a portion of each cross-strip 25 extends over the flexible sheet 28. When a second flexible sheet is present, it will likewise be placed so that its lengthwise border lies beneath the cross strip 25. The cross-strips thus cover the gap present between two adjacent flexible sheets, and limit the escape of heat and moisture from within the structure, preserving the environment within. When the gap between the flexible sheets is covered by cross-strips, the area encompassed by the flexible sheets is then entirely enclosed.

Various types of flexible sheets may be manufactured for use in the multi-purpose structure of the present invention. For example, a farmer may switch between (or simultaneously use both) flexible sheets composed of any type of mesh or plastic having the desired amount of light-permeability. Furthermore, the option exists of exchanging only a portion of the flexible sheets of the structure so that a desired amount of light is allowed in. A portion of the structure may be left with no flexible sheet as well, should this b desired.

The structure illustrated is highly secure, while at the same time allowing for fast and easily-performed removal and replacement of the flexible sheets.

Figure 3:
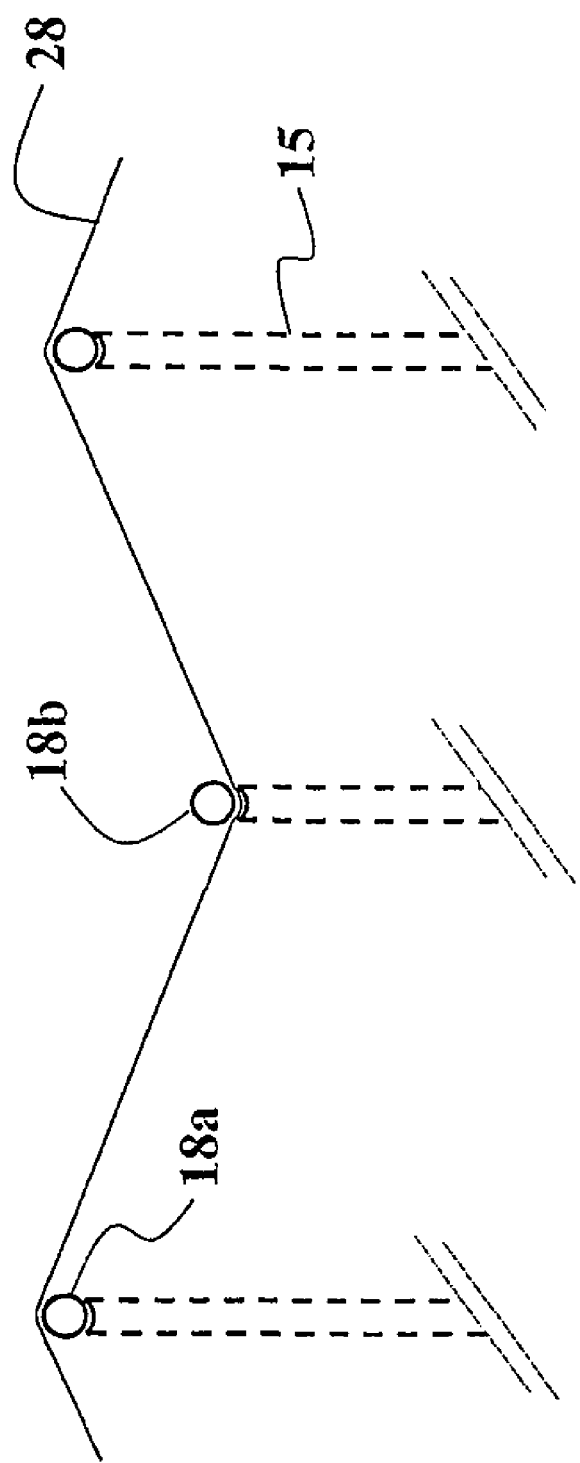
FIG. 3 is a side view of a portion of the multi-purpose structure of FIG. 1, illustrating the weaving of a flexible sheet through the connecting members.

As shown in FIG. 3, a flexible sheet 28 is simply weaved above raised connecting members and below lowered connecting members. Appropriate manual or automated means may be employed for inserting the flexible sheets. For example, a cable may be weaved through the structure (above the raised connecting members and below the lowered connecting members). Following said weaving the flexible sheet to be inserted is attached to the end of the cable and said cable is pulled out of the structure so that the flexible sheet becomes properly placed therein.

In other preferred embodiments of the present invention (not illustrated), the vertical supports have a hollow interior. Movable poles are located in the interior of a portion of the vertical supports that may be raised by any appropriate mechanical means. After the desired number of flexible sheets are inserted into structure, said poles are raised, thereby causing the flexible sheets to be held tightly in the desired configuration. It is appreciated that this embodiment enables more precise control over the tautness of the roof of the structure. Any appropriate means maybe employed to raise the poles by the desired amount.

It is appreciated that the size of the structure may be varied, both in construction and in usage. From the construction vantage point, the structure may be built to accommodate any length of flexible sheet, or any numbers of flexible sheets Furthermore, the height of the structure may also be varied. In usage, a section of the structure may be left open, if, for example, the particular type of plant located under said section requires extra sunlight in order to grow. Furthermore, the structure need not be strictly rectangular or square shaped, but it may also be, for example, "T" shaped, or any other shape that is desired Also, different types of flexible sheets may be installed in different sections of the structure, again according to the particular plant(s) located in said section or based n the positioning of the structure with respect to the sun.

Those skilled in the art will appreciate that numerous modifications and adaptations may be made to the multi-purpose structure of the present invention, without departing from the spirit and scope of the invention, as set out in the claims.

The invention claimed is:

1. A multi-purpose structure, comprising
a plurality of vertical supports arranged in a plurality of rows;
a plurality of connecting members each of which extends along one of said row and is supported by the vertical supports in said row at tops of said vertical supports; and
at least two cross strips extending between and being affixed to some of said connecting members, wherein said cross strips do not overlap each other and have respective adjacent edges that are spaced from each other, a spacing between said adjacent edges defining an opening in a roof of said structure, said opening being coverable by a flexible sheet removably insertable below said cross strips with lengthwise borders of the flexible sheet being covered by the cross strips from above;

wherein said cross strips extend under a first set of said connecting members and over a second set of said connecting members;

the vertical supports that support the connecting members of said first set are shorter than the vertical supports that support the connecting members of said second set; and said cross strips are affixed only to the connecting members of said first set without being attached to the connecting members of said second set.

2. The multi-purpose structure according to claim 1, wherein the rows of the vertical supports are constructed with a predetermined height pattern such that when said flexible sheet is weaved through the connecting members, the roof of the structure assumes a predetermined form.

3. The multi-purpose structure according to claim 1, wherein every other row of said vertical supports has substantially the same height such that when said flexible sheet is weaved through the connecting members, the roof of the structure assumes a form having at least one triangle-shaped peak.

4. The multi-purpose structure according to claim 1, wherein the cross strips are made of plastic.

5. The multi-purpose structure according to claim 1, further comprising at least one pole positioned inside at least one of said vertical supports, said pole being moveable upwardly so as to extend from the top of said vertical support.

6. A multi-purpose structure, comprising
a plurality of vertical supports arranged in a plurality of rows;
a plurality of connecting members each of which extends along one of said row and is supported by the vertical supports in said row at tops of said vertical supports;
at least two cross strips extending between and being affixed to some of said connecting members, wherein said cross strips do not overlap each other and have respective adjacent edges that are spaced from each other, a spacing between said adjacent edges defining an opening in a roof of said structure; and
at least one flexible sheet removably inserted below said cross strips to extend between said connecting members, said flexible sheet having two opposite lengthwise borders being covered by the cross strips from above, respectively, whereby said flexible sheet closes the opening the roof of said structure;

wherein said cross strips and said flexible sheet extend under a first set of said connecting members and over a second set of said connecting members, wherein the vertical supports of said first set of the connecting members are shorter than the vertical supports of said second set of the connecting members; and said cross strips are affixed only to the connecting members of said first set without being attached to the connecting members of said second set.

7. The multi-purpose structure according to claim 6, further comprising a plurality of said flexible sheets inserted therein, wherein each of said flexible sheets has a width substantially equal to the width between two adjacent said vertical supports in one of said rows.

8. The multi-purpose structure according to claim 7, wherein the flexible sheets are selected from materials having varying degrees of transparency.

9. The multi-purpose structure according to claim 6, wherein the flexible sheet is comprised of plastic.

10. The multi-purpose structure according to claim 6, wherein the flexible sheet is comprised of netting.

11. The multi-purpose structure according to claim 6, wherein the rows of the vertical supports are constructed with a predetermined height pattern such that when said flexible sheet is weaved through the connecting members, the roof of the structure assumes a predetermined form.

12. The multi-purpose structure according to claim 6, wherein every other row of said vertical supports has substantially the same height such that when said flexible sheet is weaved through the connecting members, the roof of the structure assumes a form having at least one triangle-shaped peak.

13. The multi-purpose structure according to claim 6, wherein the cross strips are made of plastic.

14. The multi-purpose structure according to claim 6, further comprising at least one pole positioned inside at least one of said vertical supports, said pole being moveable upwardly so as to extend from the top of said vertical support.

15. The structure of claim 6, wherein said flexible sheet has a width substantially equal to a distance between two adjacent said vertical supports in one of said rows and each of said cross strips has a width smaller than said distance.

16. The structure of claim 15, comprising a plurality of said flexible sheets, which do not overlap each other, adjacent said flexible sheets having respective adjacent edges that are spaced from each other by a gap covered from above by one of said cross strips.

* * * * *